UNITED STATES PATENT OFFICE 2,578,651

1,1,DIPHENYL-3(N-PIPERIDYL)PROPANE SALTS OF PENICILLIN

Frank H. Buckwalter, Dewitt, N. Y., assignor to Bristol Laboratories, Inc., Syracuse, N. Y., a corporation of New York No Drawing. Application October 19, 1948, Serial No. 55,439

4 Claims. (Cl. 260—239.1)

The present invention relates to a new amine salt of penicillin, more particularly 1,1,-diphenyl-3(N-piperidyl)propane salts of penicillin which is capable of exerting a repository antibiotic action.

The new penicillin salt of the present invention has the following formula

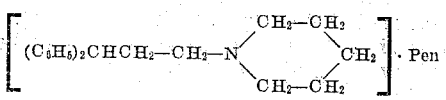 · Pen wherein Pen designates an acid penicillin radical or an active moiety thereof, capable of forming an addition salt with 1,1,diphenyl-3(N-piperidyl)propane.

A more comprehensive understanding of this invention is obtained by reference to the following examples.

EXAMPLE 1

0.58 gram of 1,1,diphenyl-3(N-piperidyl)propane hydrochloride (1 mole) is dissolved in 10 cc. of water to make a first solution. 0.66 gram of sodium penicillin G (1 mole) are dissolved in 20 cc. of water to yield a solution containing 59,650 units per cc. to make a second solution. The water solution of 1,1,diphenyl-3(N - piperidyl)propane hydrochloride is then added to the water solution of sodium penicillin G and 1.2 grams of a white crystalline precipitate of 1,1,diphenyl-3(N-piperidyl)propane penicillin is immediately formed having a potency of 600 units per mg., theoretical potency 968 units per mg., yield 1.1 gm.

EXAMPLE 2

0.58 gram of 1,1,diphenyl-3(N-piperidyl)propane hydrochloride (1 mole) are dissolved in 10 cc. of water. .066 gram of sodium penicillin G are dissolved in 2.0 cc. of water to yield a solution containing 59,650 units per cc. The solution of 1,1,diphenyl - 3(N - piperidyl)propane hydrochloride is then reacted with the water solution of sodium penicillin G at pH 6.5. 0.2 gram of a white crystalline precipitate of 1,1,diphenyl-3-(N-piperidyl)propane penicillin was immediately formed having a potency of 763 units per mg.

EXAMPLE 3

1.16 grams of 1,1,diphenyl-3(N-piperidyl)propane hydrochloride (1 mole) are suspended in a separatory funnel in ether and 5 N sodium hydroxide is added, with shaking, to pH 8. The water layer is then separated and the ether layer is dried by adding sodium sulfate and filtered.

1.32 grams of sodium penicillin G are dissolved in water in a separatory funnel and an equal volume of ether is added. Phosphoric acid is then added to the mixture of ether and water solution of penicillin, to pH 2.5. The water layer is separated and the ether layer is dried by adding sodium sulfate and filtered. The dried ether solution of penicillin G acid is then added to the dried ether solution of 1,1,diphenyl - 3(N-piperidyl)propane and 1.8 grams of a white crystalline precipitate is obtained having a potency of 1185 units per mg.

The following tables show the results obtained when rabbits are injected with fifty thousand units of 1,1,diphenyl-3(N-piperidyl)propane salt of penicillin G suspended in various vehicles.

*1,1,diphenyl-3(N-piperidyl)propane salt of penicillin G (225,000 units per cc.) in aqueous solution*

| Rabbit No. | Rabbit Wt. | Blood Level, Hours | | | | | | | | | |
|---|---|---|---|---|---|---|---|---|---|---|---|
| | | 0 | 1 | 4 | 24 | 48 | 72 | 96 | 120 | 144 | 168 | 192 |
| 801 | 2.6 | 0 | 0.38 | .24 | .14 | .06 | .05 | .05 | .06 | .05 | .04 | .05 |
| 803 | 2.6 | 0 | 0.28 | .22 | .12 | .05 | .08 | 0 | .04 | .04 | .03 | .03 |
| 804 | 2.6 | 0 | 0.63 | .37 | .27 | .20 | .15 | .09 | .07 | .10 | .05 | .08 |
| 807 | 2.5 | 0 | .30 | .24 | .12 | .08 | .11 | .08 | .06 | .05 | .05 | .04 |
| 715 | 2.7 | 0 | 1.10 | 1.00 | 0.53 | .25 | .18 | 0 | 0 | 0 | 0 | 0 |

*1,1,diphenyl-3(N-piperidyl)propane salt of penicillin G (256,000 units per cc.) plus*

$Na_2H_2PO_4 \cdot 12H_2O$

*in aqueous solution*

| Rabbit No. | Rabbit Wt. | Blood Levels, Hours | | | | | | | | | |
|---|---|---|---|---|---|---|---|---|---|---|---|
| | | 0 | 1 | 4 | 24 | 48 | 72 | 96 | 120 | 144 | 168 | 192 |
| 794 | 2.6 | 0 | .60 | .50 | .31 | .10 | .06 | .05 | .03 | .04 | .03 | .03 |
| 641 | 3.9 | 0 | .49 | .49 | .28 | .16 | .15 | .10 | .09 | .11 | .05 | .012 |
| 650 | 3.8 | 0 | .25 | .27 | .13 | .07 | .05 | .05 | .03 | .05 | .03 | .05 |
| 485 | 4.0 | 0 | .39 | 0 | .20 | .15 | .06 | .04 | .05 | .05 | .30 | .05 |

*1,1,diphenyl-3(N-piperidyl)propane salt of penicillin G (257,000 units per cc.) and 5% sodium citrate in aqueous solution*

| Rabbit No. | Rabbit Wt. | Blood Levels, Hours | | | | | | | | | |
|---|---|---|---|---|---|---|---|---|---|---|---|
| | | 0 | 1 | 4 | 24 | 48 | 72 | 96 | 120 | 144 | 168 | 192 |
| 814 | 2.7 | 0 | .37 | .31 | .15 | .11 | .16 | .06 | .06 | .05 | .04 | .05 |
| 819 | 3.2 | 0 | .63 | 2.05 | .19 | .10 | .10 | .06 | .05 | .05 | .05 | .04 |

1,1,diphenyl-3(N-piperidyl)propane salt of penicillin G plus "Tween 40" in aqueous solution

| Rabbit No. | Rabbit Wt. | Blood Levels, Hours ||||||||||
|---|---|---|---|---|---|---|---|---|---|---|---|
| | | 0 | 1 | 4 | 24 | 48 | 72 | 96 | 120 | 144 | 168 | 192 |
| 808 | 3.2 | 0 | .60 | .49 | .25 | .13 | .12 | .10 | .07 | .07 | .05 | .07 |
| 810 | 3.3 | 0 | .83 | .78 | .39 | .14 | .13 | .08 | .07 | .06 | .04 | .05 |
| 811 | 3.2 | 0 | .50 | .43 | .20 | .10 | .13 | .08 | .06 | .06 | .04 | .06 |
| 812 | 3.1 | 0 | .75 | .95 | .31 | .13 | .17 | .07 | .06 | .05 | .03 | .09 |

While the present invention has been described with particular reference to the 1,1,diphenyl-3(N-piperidyl)propane addition salts of penicillin G it will be understood that 1,1,diphenyl-3(N-piperidyl)propane salts of other penicillins are also included within the scope of this invention. For instance the natural penicillins such as penicillin G, F, X, dihydro F, and K.

EXAMPLE 4

The teachings of this invention may be followed to prepare a salt of penicillin X and 1,1,diphenyl-3-(N-piperidyl)propane. As shown in Examples 1 and 2 above a method may be followed which comprises the step of reacting the soluble salt of penicillin with 1,1,diphenyl-3(N-piperidyl)propane hydrochloride in aqueous solution and recovering the salt of 1,1,diphenyl-3(N-piperidyl)propane penicillin X.

EXAMPLE 5

The teachings of this invention may be followed to prepare a salt of penicillin dihydro F and 1,1,diphenyl-3(N-piperidyl)propane. As shown in Examples 1 and 2 above a method may be followed which comprises the step of reacting the soluble salt of penicillin with 1,1,diphenyl-3(N-piperidyl)propane hydrochloride in aqueous solution and recovering the salt of 1,1,diphenyl-3(N-piperidyl)propane penicillin dihydro F.

The 1,1,diphenyl-3(N-piperidyl)propane hydrochloride used in the practice of this invention is prepared according to the method shown in Report No. PB–981, Office of the Publication Board, Department of Commerce, Washington, D. C., entitled "Pharmaceutical Activities at the I. G. Farbenindustrie Plant, Hochst am Main, July 1945," page 41.

It will also be understood that the reaction can be carried out in organic solvents other than ether. Examples of such solvents are butanol, propanol, amyl acetate, methyl amyl acetate, isopropyl ether, mesityl oxide, methyl isobutyl ketone.

EXAMPLE 6

The teachings of this invention may be followed to prepare a salt of penicillin X and 1,1,diphenyl-3(N-piperidyl)propane. As shown in Example 3 above a method may be followed which comprises the step of reacting the soluble salt of penicillin with 1,1,diphenyl - 3(N - piperidyl)propane hydrochloride in an organic solvent solution and recovering the salt of 1,1,diphenyl-3(N-piperidyl)propane penicillin X.

EXAMPLE 7

The teachings of this invention may be followed to prepare a salt of penicillin dihydro F and 1,1,diphenyl - 3(N - piperidyl)propane. As shown in Example 3 above a method may be followed which comprises the step of reacting the soluble salt of penicillin with 1,1,diphenyl-3(N-piperidyl)propane hydrochloride in an organic solvent solution and recovering the salt of 1,1,diphenyl-3(N-piperidyl)propane penicillin dihydro F.

It will be understood that, without departing from the spirit of the invention or the scope of the claims, various modifications may be made in the specific expedients described. The latter are illustrative only, and not offered in a restricting sense, it being desired that only such limitations shall be placed thereon as may be required by the state of the prior art.

I claim:
1. A crystalline salt of penicillin and 1,1,diphenyl-3(N-piperidyl)propane.
2. A crystalline salt of penicillin G and 1,1,diphenyl-3(N-piperidyl)propane.
3. A crystalline salt of penicillin X and 1,1,diphenyl-3(N-piperidyl)propane.
4. A crystalline salt of penicillin dihydro F and 1,1,diphenyl-3(N-piperidyl propane.

FRANK H. BUCKWALTER.

REFERENCES CITED

The following references are of record in the file of this patent:

UNITED STATES PATENTS

| Number | Name | Date |
|---|---|---|
| 2,493,625 | Goldberg et al. | Jan. 3, 1950 |
| 2,515,898 | Rhodehamel | July 18, 1950 |

OTHER REFERENCES

British Report CMR–Br234(PB79,927) received U. S. April 18, 1946, published December 5, 1947, pp. 1–4.